April 4, 1961

W. GORMAN 2,978,127

HAND TRUCK

Filed Dec. 28, 1959

INVENTOR.
WILLIAM GORMAN
BY
Kimmel & Crowell
ATTORNEYS

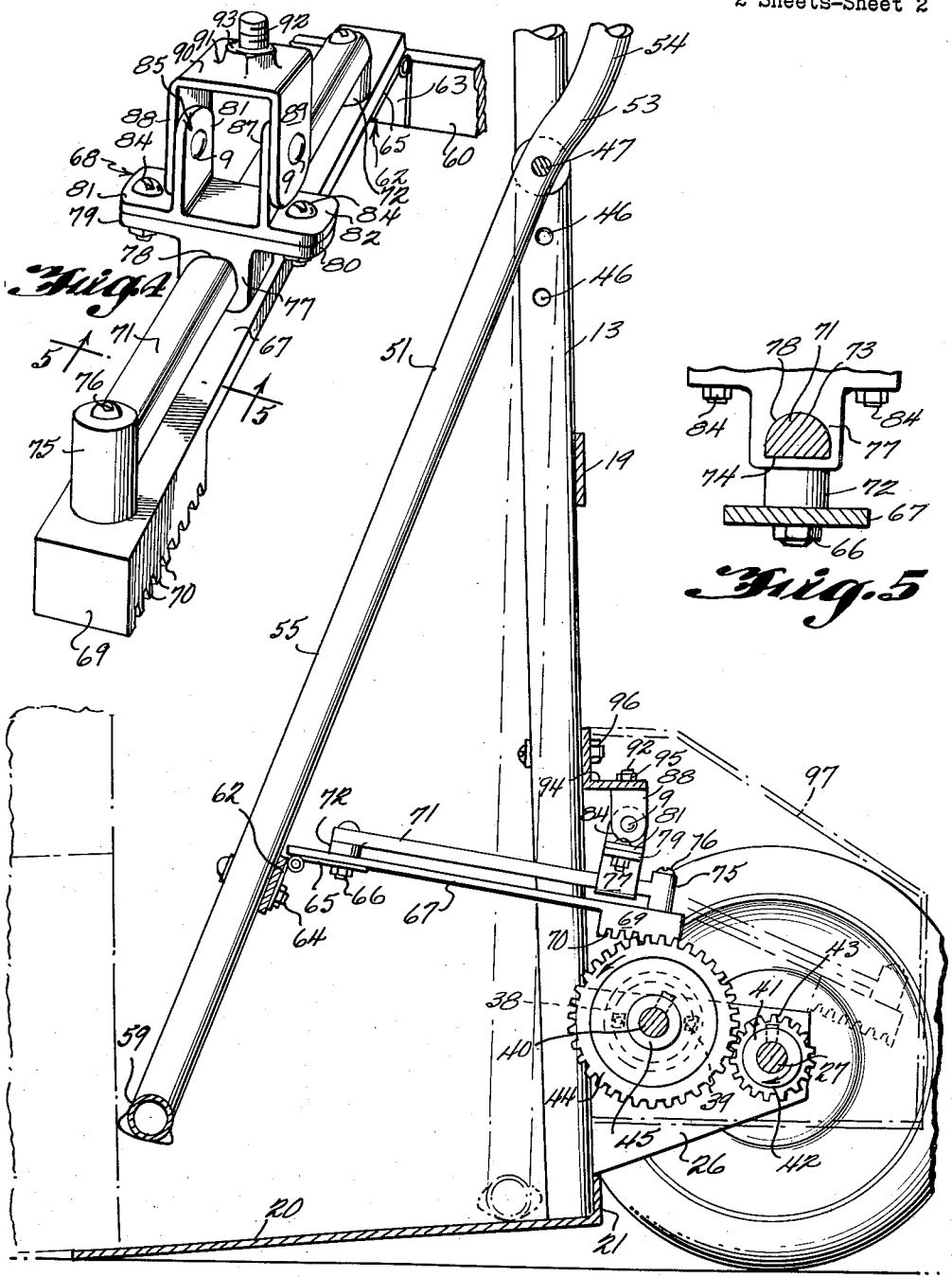

United States Patent Office 2,978,127
Patented Apr. 4, 1961.

2,978,127
HAND TRUCK
William Gorman, 3123 Bancroft Road, Baltimore, Md.
Filed Dec. 28, 1959, Ser. No. 862,218
2 Claims. (Cl. 214—355)

This invention relates to improvements in hand trucks and more particularly to the type of hand trucks that is hand-pushed and is used by porters, stevedores, warehousemen and the like for transporting light loads to various destinations.

More particularly the invention relates to a load ejecting means of the manually operated type which will dislodge the load from the truck. Such means being of a lever operated type whereby a certain throw of the lever will start to eject the load from the truck, and a further throw of the lever, using the load as a fulcrum will move the truck from contact with the load.

It is an important object of the invention, therefore, to provide a lever actuated load ejecting means which, during its operation, performs two different operations, first, the part ejection of the load and then the full removal of the truck from contact with the load.

Another object of the invention is to provide a hand truck of this type which will permit spotting of the load, as well as the placing of the load close to a wall or close to a stack of articles similar to the load being carried.

A further object of the invention is to provide a hand truck of this type that is simple in operation, requires few moving parts for its construction which results in an economical manufacturing problem.

With the above and other objects and advantages in view, this invention consists of the novel details of construction, arrangement and combination of parts more fully hereinafter described, claimed and illustrated in the accompanying drawings, in which:

Fig. 2 is a transverse sectional view on the line 2—2 of Fig. 1;

Fig. 4 is a perspective view of a retracting mechanism for the hand truck; and

Fig. 5 is a transverse sectional view on the line 5—5 of Fig. 4.

Figures 1, 3:
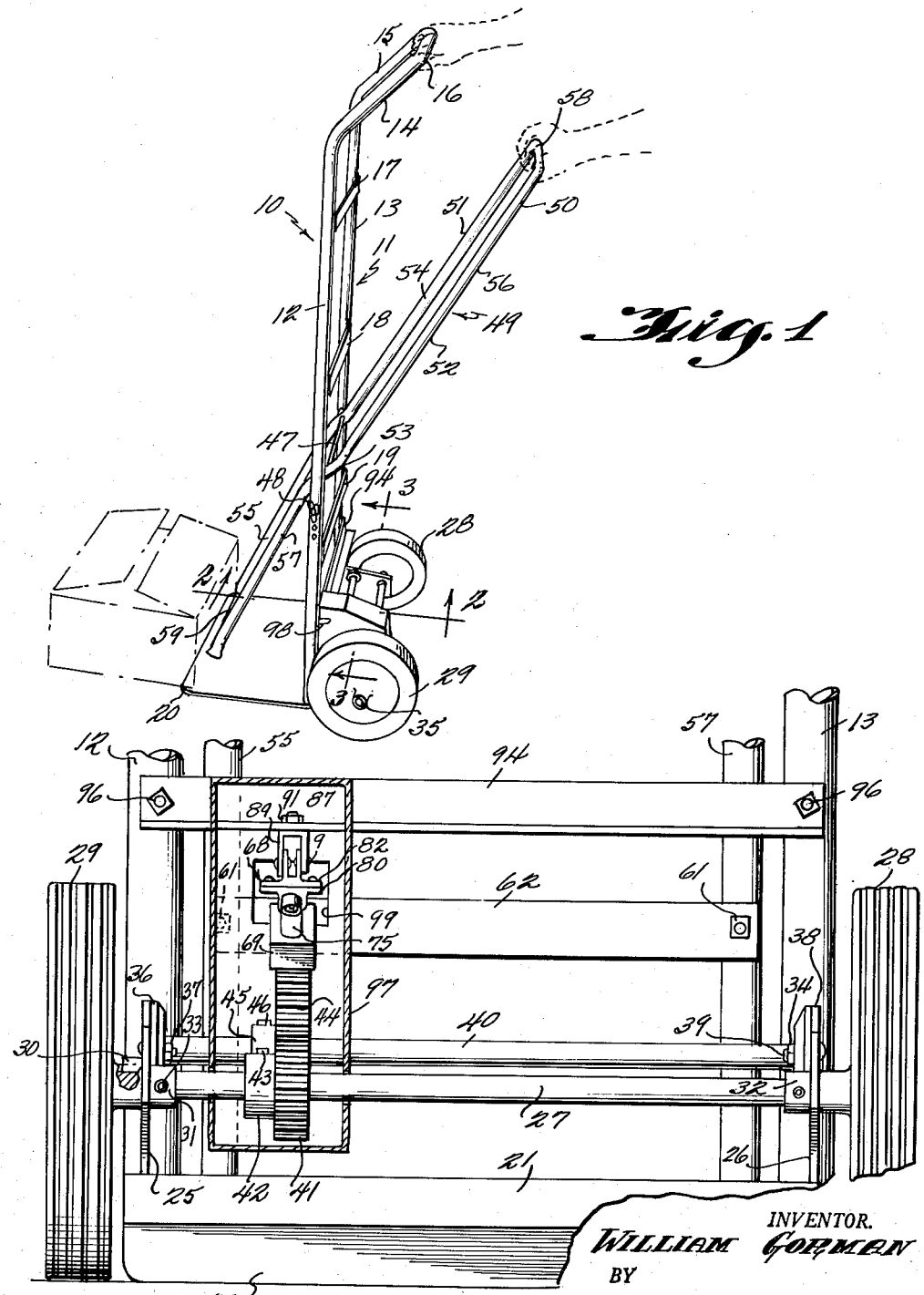
Fig. 1 is a side elevational view of a hand truck embodying the invention in position to address a package.
Fig. 3 is a vertical sectional view on the line 3—3 of Fig. 1.

Referring more in detail to the drawings, wherein like parts are designated by like reference numerals, the reference numeral 10 is used to generally designate a hand truck embodying the invention.

The hand truck 10 comprises a generally U-shaped frame 11 which includes side members 12 and 13, at the upper ends of each of the side members 12 and 13 there are rearwardly inclined upper end portions 14 and 15 which are joined at their free ends by a hand rail or transverse member 16.

A plurality of transverse brace members 17, 18 and 19 are secured at their outer ends to the side members 12 and 13 in equally spaced parallel relation to each other for reinforcing the side members 12 and 13. The U-shaped frame 11 is constructed of tubular members that possess strength, yet are light in weight so that the weight of the frame adds little to the weight of the entire hand truck 10.

The usual flat bottom or load supporting base 20 is provided for the hand truck 10 and the lower ends of the side members 12 and 13 are secured in rigid relation to the opposite ends of an upstanding vertically disposed flange 21 that is formed integrally with the rear edge of the base 20.

Rigidly secured to the lower ends of the side members 12 and 13 are a pair of rearwardly extending substantially triangular shaped axle supporting plates 25 and 26.

Journalled in the plates 25 and 26 is a transversely extending axle 27 and a ground engaging rubber tired wheel 28 is rotatably mounted on one outer end of the axle 27. In this manner the wheel 28 is mounted to the right of the hand truck 10 as it is approached by the operator. On the opposite or left-hand end of the axle 27 there is mounted a similar rubber tired wheel 29, but the wheel 29 is keyed to the shaft for rotation therewith by a key 30.

Spacing collars 31 and 32 are adjustably secured to the axle 27 inwardly of the plates 25 and 26 by set screws 33 and 34, and a retaining collar 35 is secured to the outer left-hand end of the axle 27 outwardly of the wheel 29 and a similar collar, not shown, is also secured to the outer right-hand end of the axle 27 outwardly of the wheel 28.

A circular bearing plate 36 is secured by fasteners 37 to the inner surface of the plate 25 forwardly of the axle 27 and a similar circular bearing plate 38 is secured by fasteners 39 to the inner surface of the plate 26 forwardly of the axle 27.

A shaft 40 is journaleld at its opposite ends in the bearing plates 36 and 38 in parallel relation to the axle 27.

A small gear 41 is mounted on the axle 27 adjacent the plate 25 and the gear 41 has a hub 42 in which is provided a set screw 43 whereby the gear 41 may be adjustably and rigidly secured to the axle 27.

A second gear 44 of larger diameter is mounted on the shaft 40 and the gear 44 has a hub 45 in which is provided a set screw 46 whereby the gear 44 is rigidly retained on the shaft 40 in meshing engagement with the gear 41.

The side members 12 and 13 are provided with a plurality of equally spaced alined openings 46 which are positioned intermediate of the brace members 18 and 19. A shaft 47 is adapted to be selectively received in the openings 46 for a purpose to be later described. Cotter keys 48 engaging openings in the opposite ends of the shaft 47 retain the shaft 47 in selective position in the openings 46.

An ejector or follower 49 is pivotally mounted on the shaft 47 and the ejector or follower 49 takes the form of an elongated rectangular shaped frame 50. The frame 50 comprises side members 51 and 52 and the side members 51 and 52 each have an arcuate bend 53 therein so that the upper portion 54 of the side member 51 lies in a different plane than the lower portion 55 thereof. The side member 52 therefor has an upper portion 56 that lies in the same plane and is parallel to the upper portion 54 of the side member 51. The lower portion 57 of the side member 52 will therefore lie in the same plane and be parallel to the lower portion 55 of the side member 51. The free ends of the upper portions 54 and 56 are bridged by a cross member or a hand grip 58 and the lower ends of the lower portions 55 and 57 are bridged by a cross member or push bar 59. The frame 50 is positioned between the side members 12 and 13 of the hand truck 10 so that the hand grip 58 is located in adjacent and parallel relation to the hand rail 16. Thus, the hand rail 16 can be grasped with one hand and the hand grip 58 can be grasped with the other hand, as shown in Fig. 1.

A cross brace or plate 60 is secured at its opposite ends to the lower portions 55 and 57 in parallel spaced relation to the push bar 59 by fasteners 61 and a two leaf hinge 62 has one leaf 63 thereof secured to the plate 60 by fasteners 64. The remaining leaf 65 of the hinge 62 is secured by a fastener 66 to a rack supporting bar 67 of an ejecting mechanism 68, Fig. 4. The free end of the bar 67 has an enlarged portion 69 integral therewith and a rack 70 is formed on the lower surface of the portion 69.

A guide rod 71 has one end secured to the bar 67 by the fastener 66 and a spacer 72 mounted on the fastener 66 intermediate of the bar 67 and rod 71, elevates the rod above the bar 67. The rod 71 has an arcuate upper surface 73 and a flat bottom surface 74, Fig. 5, and the opposite end of the rod 71 has an enlarged apertured cylindrical member 75 integral therewith. A fastener 76 extending through the apertured member 75 aids the fastener 66 in rigidly securing the rod 71 to the bar 67 in spaced parallel relation thereto.

The rod 71 is slidably mounted in a T-shaped hanger 77 that has an opening 78 therein that conforms to the shape of the rod 71. The hanger 77 has oppositely extended wing portions 79 and 80 that are secured to wing portions 81 and 82 of a coupling 83 by fasteners 84. The wing portions 81 and 82 extend outwardly from a U-shaped portion 85 of the coupling 83. The portion 85 comprises a pair of parallel vertically disposed ear portions 86 and 87 that are pivotally connected to a pair of parallel spaced ear portions 88 and 89 of a U-shaped coupling 90 by rivets 9.

The coupling 90 includes a base portion 91 which bridges the ends of the ear portions 88 and 89 and a stud 92 is secured in a raised portion 93 formed in the center of the base portion 91 and the stud 92 is extended through an opening in an angle iron crossbar 94 to receive a nut 95 thereon. The crossbar 94 is secured at its opposite ends to the side members 12 and 13 of the hand truck 10 in parallel relation to the plate 60 by fasteners 96.

A housing 97 is provided to cover the ejecting mechanism 68 and the housing is removably mounted on the angle bar 94 by reason of alined slots 98 in the sides thereof, Fig. 1. The housing 97 has opening 99 therein through which the plate 67 and rod 71 extend.

In the operation of the hand truck 10, after a load has been deposited on the base 20 and is wheeled to the desired location, the question of removing the load from the hand truck 10 has to be considered. In order to spot the load in a position close to a wall or a stack of similar articles with a conventional hand truck, a series of twisting movements with the conventional hand truck was required.

With the present hand truck embodying the invention, the hand truck 10 is wheeled to the wall or stack until the load is in close contact therewith. The operator then grasps the hand grip 58 and pulls it toward him. The ejector or follower 49 pivoting on the shaft 47 causes the push bar 59 to engage the load and start pushing it off of the base 20. The load, however, will not entirely leave the base 20 due to the fact that the load is often wider than the base 20. Thus, when the rack 70 engages the gear 38, the load acting as a fulcrum pushes the hand truck rearwardly until the base 20 is free of the load. The lever movement of the ejector or follower is limited so that when the portion 75 of the rod 71 engages the hanger 77, the load is free of the base 20 and the hand truck 10 may be removed.

The action of the ejecting mechanism 68 is created by the ejector or follower 49 pulling the guide rod 71 forward in the hanger 77 and the pivotal action of the hanger 77 causes the rack 70 to come into contact with and engage the gear 38. The gear 38 then causes rotation of the gear 42 which is fixed to the axle 27. The rotation of the axle 27 subsequently causes rotation of the wheel 29 by reason of the key construction 30 existing between the wheel 29 and axle 27. The wheel 29 will then by reason of its contact with the ground, roll the hand truck away from the load.

Viewing Fig. 2, it will be noted that the ejecting mechanism is positioned to the left of the hand truck 10. This is done so that the operator may place his foot on the right-hand portion of the axle 27 so that the hand truck may be pushed under the load.

The invention provides quick and easy unloading of the hand truck and it is believed that from the foregoing description the structure and operation of the invention will be clear to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A hand truck comprising a substantially U-shaped frame including a bight and depending legs, a base for supporting a load secured to the lower end of said legs, an axle mounted on said frame rearwardly of said base, wheels mounted on said axle, at least one of said wheels being secured to said axle for rotation therewith, a load ejecting frame comprised of a pair of side bars extending substantially the full length of the legs of said U-shaped frame, each pivotally connected to one of said legs at an intermediate point, a pusher bar connecting said side bars adjacent said base, and a handle bar connecting said side bars adjacent said bight, a shaft extending between said legs adjacent said axle, a first gear on said shaft, a second gear on said axle meshing with said first mentioned gear, a cross brace extending between said side bars above said pusher bar, a hinge having one leaf secured to said cross bar, a rack supporting bar secured to the other leaf of said hinge, a guide rod secured in parallel relation to said rack supporting bar, a second cross bar extending between said legs adjacent said shaft, a hanger pivotally connected to said second cross bar, said hanger including a cylindrical portion encompassing said guide rod for sliding movement of said guide rod therein, and a rack carried by said rack supporting bar engaging said first gear for rotation thereof and hence said axle upon pivotal movement of said ejecting frame.

2. A hand truck comprising a substantially U-shaped frame including a bight and depending legs, a base for supporting a load secured to the lower end of said legs, an axle mounted on said frame rearwardly of said base, wheels mounted on said axle, at least one of said wheels being secured to said axle for rotation therewith, a load ejecting frame comprised of a pair of side bars extending substantially the full length of the legs of said U-shaped frame, each pivotally connected to one of said legs at an intermediate point, a pusher bar connecting said side bars adjacent said base, and a handle bar connecting said side bars adjacent said bight, a gear on said axle, a cross brace extending between said side bars above said pusher bar, a rack supporting bar pivotally connected to said cross brace, a second cross brace extending between said legs adjacent said shaft, a hanger pivotally connected to said second cross brace, a sliding connection between said hanger and said second cross brace for sliding movement of said rack supporting bar and a rack carried by said rack supporting bar for engaging said gear for rotation thereof and hence said axle upon pivotal movement of said ejecting frame.

References Cited in the file of this patent

UNITED STATES PATENTS

| | | |
|---|---|---|
| 2,765,090 | Halls | Oct. 2, 1956 |
| 2,785,818 | Mercier et al. | Mar. 19, 1957 |
| 2,856,090 | Peters | Oct. 14, 1958 |